US005596210A

United States Patent [19]
Konishi et al.

[11] Patent Number: 5,596,210
[45] Date of Patent: Jan. 21, 1997

[54] LIGHT TRIGGER TYPE SEMICONDUCTOR DEVICE WITH REFLECTION PREVENTION FILM

[75] Inventors: Yuzuru Konishi; Kyotaro Hirasawa; Kazunori Taguchi, all of Fukuoka, Japan

[73] Assignee: Mitsubishi Denki Kabushiki Kaisha, Tokyo, Japan

[21] Appl. No.: 407,648

[22] Filed: Mar. 21, 1995

[30]    Foreign Application Priority Data

Apr. 12, 1994   [JP]   Japan .................................. 6-073129

[51] Int. Cl.$^6$ .............................................. H01L 31/0232
[52] U.S. Cl. .............................. 257/98; 257/99; 257/116; 257/117; 257/432; 257/434; 257/437; 385/49
[58] Field of Search ........................... 257/98, 100, 432, 257/437, 116, 117, 99, 433, 434; 385/49

[56]            References Cited

U.S. PATENT DOCUMENTS 4,790,620   12/1988   Niwayama ........................ 350/96.20

FOREIGN PATENT DOCUMENTS 60-42875   3/1985   Japan .

OTHER PUBLICATIONS

Patent Abstracts of Japan, Unexamined Applications, E Field, Vol. 9, No. 169 (E-328) (1892), Jul. 13, 1985, JP-60-42875, Mar. 7, 1985.

Primary Examiner—William Mintel
Attorney, Agent, or Firm—Oblon, Spivak, McClelland, Maier & Neustadt, P.C.

[57]              ABSTRACT

An object of the present invention is to enhance the transmission efficiency of light signals. An output end of a light guide is coupled to a light receiving portion of a semiconductor substrate with an optical coupling agent. Reflection preventing films of silicon dioxide are formed on both the output end and the input end of the light guide. Similar reflection preventing films are formed on both surfaces of a light introducing window provided at the input end of the light guide, too. The light introducing window is provided to maintain the inside of the device airtight while enabling passage of light signals. Since the reflection preventing films are formed, the transmission efficiency of light signals is high, so that the sensitivity of the device increases.

8 Claims, 5 Drawing Sheets

SECTION A-A

LIGHT TRIGGER TYPE SEMICONDUCTOR DEVICE WITH REFLECTION PREVENTION FILM

BACKGROUND OF THE INVENTION

1. Field of the Invention

The present invention relates to light trigger type semiconductor devices, and particularly to an improvement for enhancing the transmission efficiency of light signals.

2. Description of the Background Art

FIG. 9 is a front sectional view showing an example of a light activated thyristor (a light trigger type thyristor) of the pressure welding type. As shown in FIG.9, in this light activated thyristor, a thermal compensating plate 3 formed of material having its coefficient of thermal expansion approximate to that of a semiconductor substrate 1 is attached to the lower main surface of the semiconductor substrate 1 having the thyristor elements built therein. This thermal compensating plate 3 and the semiconductor substrate 1 are soldered to each other with solder material such as aluminum or aluminum-silicon.

The thermal compensating plate 3 is subjected to the shaping processing at its end surface, and also subjected to the chemical treatment, and further, the surface treatment agent is applied thereto. A main electrode 5 formed of copper abuts on the lower main surface of the thermal compensating plate 3. This main electrode 5 is silver-soldered to an insulation tube 6 formed of ceramics through a metal plate 8.

Another thermal compensating plate 2 is provided on the upper main surface of the semiconductor substrate 1. This thermal compensating plate 2 is made to adhere to the upper main surface of the semiconductor substrate 1 with silicone rubber, for example. A main electrode 4 formed of copper abuts on the upper main surface of the thermal compensating plate 2. The main electrode 4 is silver-soldered to the insulation tube 6 formed of ceramics through a metal plate 7.

The insulation tube (outer surround) 6 establishes insulation between the two main electrodes and forms a housing accommodating the semiconductor substrate 1 and the like inside together with the main electrodes 4, 5 and the metal plates 7, 8. A metal tube 11a for guiding light signals and a metal tube 11b functioning as an exhaust spigot are attached to the insulation tube 6 by silver soldering.

A light guide 10 for guiding the light signals inputted from outside to a light receiving portion is inserted in the metal tube 11a. This light guide 10 airtightly adheres to the metal tube 11a with an adhesive agent such as solder or glass with low melting point. The light receiving portion 1a is provided at the center part of the semiconductor substrate 1, to which the light emitting end of the light guide 10 is fixedly coupled.

The light guide 10 and the light receiving portion 1a are bonded by using an optical coupling agent 21 such as silicone rubber or the like which has optical transparency, refractive index approximate to that of the light guide 10, and buffering effect. The light guide 10 is fixed to prevent a decrease of the coupling efficiency of the optical transmission system to transmit optical power as large as possible to the light receiving portion 1a.

The inside of the above-described housing is made airtight, and inert gas is sealed therein. With the semiconductor substrate 1, the thermal compensating plate 2, and the thermal compensating plate 3 accommodated in the housing, the end surface of the metal plate 8 silver-soldered to the main electrode 5 and the insulation tube 6 are finally welded, and the gas remaining inside is exhausted through the metal tube 11b and replaced by inert gas, and then the end portion of the metal robe 11b is arc-welded to realize the airtightness of the housing and seal of the inert gas.

The light signal is transmitted through an external optical fiber (not shown) from an external LED, LD, etc. (not shown), which serves as a light source, and then guided to the light entering end of the light guide 10 through an external connector (not shown). The light guide 10 changes the direction of progress of the incident light signal by 90° and irradiates the light receiving portion 1a from the light emitting end facing to the light receiving portion 1a of the semiconductor substrate 1.

The semiconductor substrate 1 converts the light signal into the photoelectric current in the vicinity of the light receiving portion 1a and amplifies the photoelectric current to establish a conductive state between the two main electrodes 4 and 5. That is to say, this device performs switching operation triggered by the light signals.

As the conventional semiconductor device is constructed as described above, loss occurs in the respective transmission elements and at connections among the elements while light signals are transmitted from the light source to the light receiving portion 1a of the semiconductor device, resulting in a problem that the sensitivity of the device is low. To decrease the loss has been one of the important problems of the light trigger type semiconductor devices.

SUMMARY OF THE INVENTION

According to the present invention, a light trigger type semiconductor device comprises a semiconductor substrate and a light introducing path for transmitting a light signal to the semiconductor substrate, wherein light scattering prevention treatment is applied to an end of the light introducing path.

According to the present invention, since the light scattering prevention treatment is applied to the end of the light introducing path, the light signals are transmitted to the semiconductor substrate efficiently. Therefore, the sensitivity of the device increases.

Preferably, in the light trigger type semiconductor device according to the invention, the light introducing path comprises a light introducing window at an input end of the light signal and a reflection prevention film is formed on a surface of the light introducing window.

According to the present invention, since the reflection prevention film is formed on the surface of the light introducing window forming the light introducing path, the light signals are efficiently transmitted to the semiconductor substrate.

Preferably, in the light trigger type semiconductor device according to the invention, the light introducing path comprises a linear light guide and a reflection prevention film is formed on an end of the light guide through which the light signal passes.

According to the present invention, since the reflection prevention film is formed on the end of the light guide, the light signals are efficiently transmitted to the semiconductor substrate.

Preferably, in the light trigger type semiconductor device according to the invention, the reflection prevention film is formed on a light entering end of the light guide.

According to the present invention, since the reflection prevention film is formed on the light entering end of the light guide, the light signals are efficiently transmitted to the semiconductor substrate.

Preferably, in the light trigger type semiconductor device according to the invention, the reflection prevention film is formed on a light emitting end of the light guide.

According to the present invention, since the reflection prevention film is formed on the light emitting end of the light guide, the light signals are efficiently transmitted to the semiconductor substrate.

Preferably, in the light trigger type semiconductor device according to the invention, the light introducing path comprises a linear light guide and the light emitting end of the light guide is attached to the semiconductor substrate through an optical coupling agent.

According to the present invention, since the light emitting end of the light guide is attached to the semiconductor substrate through the optical coupling agent, the transmission of light signals from the light emitting end of the light guide to the semiconductor substrate is made efficiently.

Preferably, in the light trigger type semiconductor device according to the invention, the reflection prevention film is substantially comprised of silicon dioxide.

According to the present invention, the reflection preventing film is substantially formed of silicon dioxide having excellent heat resistance property. Accordingly, high temperature processing such as soldering and the like can be performed after the light introducing window or the light guide having the reflection preventing film is attached to the device.

Accordingly, it is an object of the present invention to provide a light trigger type semiconductor device which efficiently transmit light signals from the introducing end to the light receiving portion of the semiconductor substrate.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
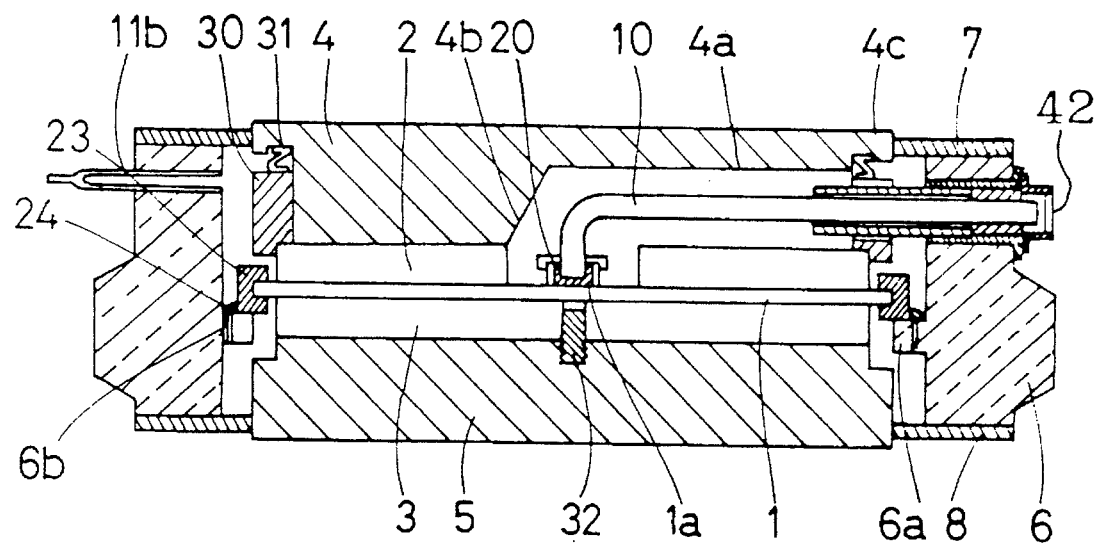
FIG. 1 is a front sectional view of a light trigger type semiconductor device in the preferred embodiment.

A preferred embodiment of the present invention will now be described referring to the figures. FIG. 1 is a front sectional view of a light activated thyristor of the pressure contact type in this preferred embodiment. In this device, a light receiving portion 1a is provided at the center portion of the upper main surface of the semiconductor substrate 1. A light emitting end of a light guide (light introducing path) 10 for transmitting light signals inputted from outside faces to this light receiving portion 1a.

A thermal compensating plate 2 and a thermal compensating plate 3 abut on the upper main surface and the lower main surface of the semiconductor substrate 1, respectively. These thermal compensating plates 2 and 3 are not alloyed to the semiconductor substrate 1 by soldering or the like, but they are pressure-contacted to the main surfaces of the semiconductor substrate 1 in a so-called alloy-free manner.

The thermal compensating plates 2 and 3 are held between the main electrodes 4 and 5, respectively. These main electrodes 4 and 5 are fixed to an insulation tube 6 formed of ceramics, for example, through circular-ring-like metal plates 7 and 8, respectively. The insulation tube 6 has an outward projection, or a concave-convex portion for suppressing creeping discharge on its outer periphery. The insulation tube 6 also has a projection 6a projecting inwardly along its inner periphery.

The thermal compensating plate 3 and the main electrode 5 are normally positioned by a screw pin 32. That is to say, a through hole is provided at the center of the thermal compensating plate 3 and a tapped hole is provided at the center of the corresponding main electrode 5, where the screw 32 which threadingly engages the tapped hole gets into the through hole of the thermal compensating plate 3 to restrict movement of the thermal compensating plate 3 in the radial direction. As the thermal compensating plate 3 does not move in the radial direction, it does not give damage to the semiconductor substrate 1. Furthermore, it does not damage nor move insulation resin 23, described later, attached to the outer periphery of the semiconductor substrate 1, either.

Moreover, the screw pin 32 threadingly engages the tapped hole of the main electrode 5 not to move in the axial direction of the through hole, so that it will not collide with the semiconductor substrate 1 to damage it. Also, the screw pin 32 prevents the movement in the radial direction in the thermal compensating plate 3 with the simplest structure of engaging only at the center portion of the thermal compensating plate 3 and the main electrode 5.

Figure 2:
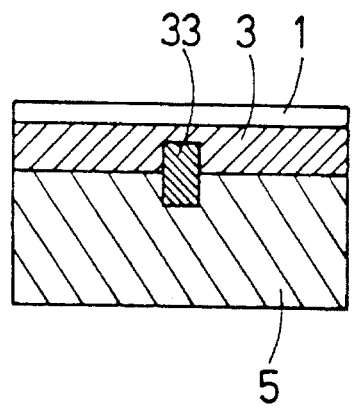
FIG. 2 is a fragmentary enlarged front sectional view of the device in the preferred embodiment.
Figure 3:
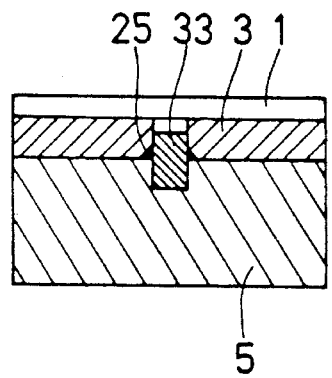
FIG. 3 is a fragmentary enlarged front sectional view of the device in the preferred embodiment.

A pin which has no screw can be used instead of the screw pin 32. Examples thereof are shown in FIG. 2 and FIG. 3. These FIG. 2 and FIG. 3 are fragmentary enlarged sectional views of the vicinity of the center part of the thermal compensating plate 3 shown in FIG. 1.

In the example shown in FIG. 2, a hole having a bottom is provided in place of the through hole at the center of the thermal compensating plate 3, and a hole having a bottom similar to that of the thermal compensating plate 3 is provided in place of the tapped hole at the center of the corresponding main electrode 5. A pin 33 having no screw is used in place of the screw pin 32, and this pin 33 gets into the both holes having bottoms to realize normal position of the thermal compensating plate 3 and the main electrode 5.

In this example, the movement of the thermal compensating plate 3 in the radial direction is also restricted, so it will not damage nor move the insulating resin 23 attached on the outer periphery of the semiconductor substrate 1. Furthermore, as the hole provided in the thermal compensating plate 3 is not a through hole but a hole having a bottom, the pin 33 will not hit the semiconductor substrate 1 to give damage to the semiconductor substrate 1.

In the example shown in FIG. 3, the pin 33 not only gets in the hole with the bottom of the main electrode 5, but it is also soldered with a solder material 25. Accordingly, the pin 33 will not move in the axial direction of the hole, so that the hole provided in the thermal compensating plate 3 may be a through hole as shown in FIG. 3. Also, instead of soldering the pin 33 to the main electrode 5, it may be soldered to the thermal compensating plate 3. Any of these structures can produce the same effects as the structure using the screw pin 32.

Referring to FIG. 1 again, a fixing ring 30 fitting to the outer peripheral surface of the main electrode 4, and the outer peripheral surface and the edge portion of the upper main surface of the thermal compensating plate 2 restricts the movement of the thermal compensating plate 2 in the radial direction. Accordingly, the thermal compensating plate 2 will not slide along the semiconductor substrate 1 to give damage to the semiconductor substrate 1 or to damage the insulation resin 23. The fixing ring 30 is formed of resin or metal such as aluminum or the like.

The main electrode 4 has a flange portion 4c projecting outwardly at the upper end of its outer peripheral surface. A spring 31 such as a spring coil, a corrugated ring spring, or a belleville spring is interposed between the lower surface of this flange portion 4c and the upper end of the fixing ring 30.

The fixing ring 30 presses and energizes the thermal compensating plates 2 and 3 and the semiconductor substrate 1 against the main electrode 5 with the elastic force of this spring 31. Accordingly, there is no possibility of the semiconductor substrate 1 and the thermal compensating plates 2 and 3 individually moving in the axial direction due to the vibration caused by the spring action of the metal plates 7 and 8 to damage the semiconductor substrate 1 and the light guide 10. Also, such a problem as damaging bonding between the light emitting end of the light guide 10 and the light receiving portion 1a of the semiconductor substrate is avoided, and the decrease in the yield of the device is suppressed. At the same time, the action of the spring 31 makes the surface contact of the thermal compensating plates 2,3 and the semiconductor substrate 1 uniform to improve the heat radiating characteristics and the like.

The movement of the semiconductor substrate 1 in the radial direction is restricted by bonding the insulation resin 23 for side wall protection adhering to the periphery of the semiconductor substrate 1 and the projection 6a in the insulation tube with the adhesive agent 24. As the movement of the semiconductor substrate 1 in the radial direction is restricted, damage caused by the semiconductor substrate 1 sliding between the thermal compensating plates 2 and 3, or the damage caused by abutting on the inner wall of the insulation tube 6 can be avoided. Furthermore, since it is fixed through the insulation resin 23, vibration and impact applied from outside are absorbed by this insulation resin 23. Accordingly, damage of the semiconductor substrate 1 due to the vibration and impact can also be suppressed.

Restricting the movements of the semiconductor substrate 1 in the radial direction is also helpful in positioning the light emitting end of the light guide 10 and the light receiving portion 1a of the semiconductor substrate. That is to say, if the positions of the light emitting end of the light guide 10 and the light receiving portion 1a are registered and then they are bonded with the adhesive agent 24, errors in dimension among parts resulted from the dimensional tolerances of the light guide 10 or the like can be adjusted to realize precise positioning.

Figure 4:
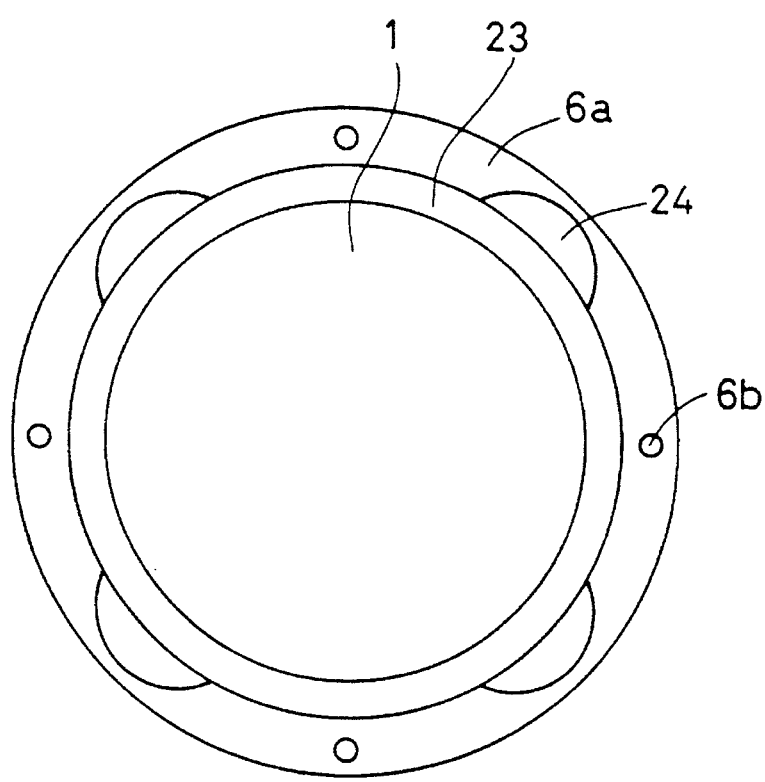
FIG. 4 is a fragmentary plan view of the device in the preferred embodiment.

FIG. 4 is a plan view showing the semiconductor substrate 1 fixed to the projection 6a. As shown in FIG. 4, the adhesive agent 24 is applied at intervals around the semiconductor substrate 1. In the projection 6a, through holes 6b passing through from the upper surface to the lower surface of the projection 6a are provided at the positions where the adhesive agent 24 is not applied to. Returning to FIG. 1, this establishes communication between above and below the semiconductor substrate 1. As a result, the gases such as the oxidizing gas, steam, and the like produced in the housing can be exhausted through the exhaust spigot 11b provided above the semiconductor substrate 1, and further the gas in the housing can be replaced by the inert gas.

Figure 5:
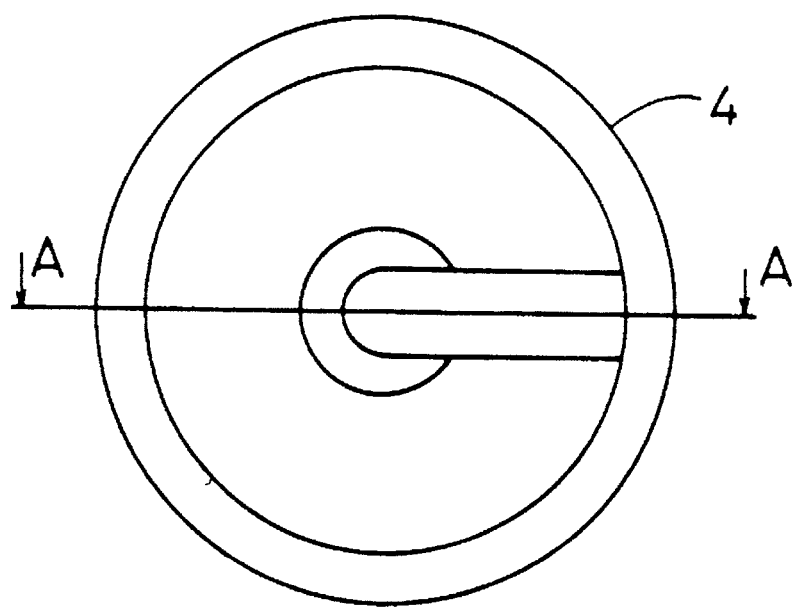
FIG. 5 is a front sectional view of the main electrode in the preferred embodiment.
Figure 6:
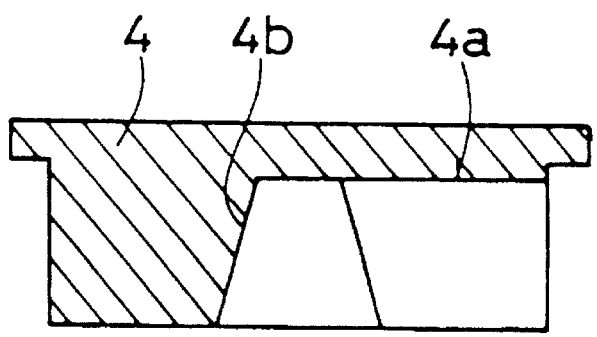
FIG. 6 is a bottom view of the main electrode in the preferred embodiment.

As shown in FIG. 1, notches 4a and 4b for introducing the light guide 10 are formed in the main electrode 4. The loss heat generated in the semiconductor substrate 1 is transmitted through the main electrodes 4 and 5 and radiated out of the device. To transmit the loss heat efficiently, it is desired that the volume of the cavity formed in the main electrode 4 by the notches 4a and 4b is as small as possible. To satisfy this demand, as shown in FIG. 5 and FIG. 6, which are respectively a sectional view and a bottom view of the main electrode 4, the shape of the notch 4b at the center of the main electrode 4 is not a cylindrical shape but a frustum of a cone, i.e., it is tapered.

This facilitates insertion of the light emitting end of the light guide 10 and attachments thereof and increases the volume of the metal part of the main electrode 4 to improve the transmission efficiency of the loss heat. The shape of the notch 4b may be a hemisphere in place of a frustum of a cone, or it may take other shapes which have its opening area increasing as it gets closer to the bottom. Though not shown in the figure, the shape of the notch 4a is also preferably set so that it becomes larger as it gets closer to the opening away from the bottom of the groove.

Figure 7:
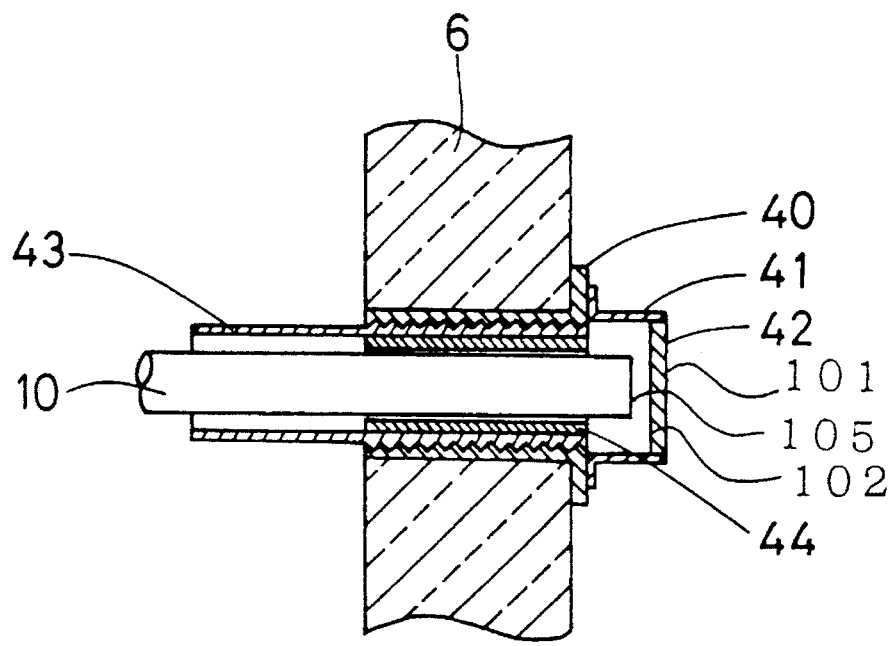
FIG. 7 is an enlarged front sectional view of the vicinity of the light introducing window in the preferred embodiment.

FIG. 7 is an enlarged front sectional view of the vicinity of the horizontal light entering end in the light guide 10 which bends in the form of "L". A through hole for transmitting the light signals is formed in the horizontal direction in the insulation tube 6. A metal tube 40 is fixedly inserted in this through hole. An optical transmissive light introducing window 42 through which light signals from outside are transmitted is airtightly bonded to this metal tube 40 through a circular-ring-like fixing jig 41. The light introducing window 42 is provided to hold the airtight state in the housing while enabling passage of light signals. A tubular body 43 threadingly engages the inner side of the metal tube 40 to be fixedly inserted therethrough.

The tubular body 43 is formed of resin or metal, for example, with its inside diameter somewhat larger than the diameter of the light guide 10 so that they are not in contact with each other. The tubular body 43 projects more inwardly than the inner side of the insulation tube 6. Even if the main electrode 4 in FIG. 1 turns in the assembling work before welding, the notch 4a will not directly abut on the light guide 10 because of the existence of the tubular body 43. That is, the tubular body 43 serves as a protection member for protecting the light guide 10. As the light guide 10 and the notch 4a do not abut on each other, damage of the light guide 10 caused by abutting is avoided, and displacement of the light emitting end of the light guide 10 from the light receiving portion 1a of the semiconductor substrate 1 will not be caused, either.

As shown in FIG. 7, an elastic tubular body 44 having flexibility, such as silicone rubber system, is interposed between the tubular body 43 and the light guide 10. The light guide 10 is flexibly supported by the metal tube 40 with this elastic tubular body 44 interposed therebetween. Accordingly, vibration, impact and the like applied from outside are absorbed by the elastic tubular body 44, and the light guide 10 is prevented from being damaged by the vibrations, impact, etc.

Further, expansion and shrinkage of members such as the light guide 10 and the like with repeated temperature change, i.e., temperature cycle are absorbed by the elastic tubular body 44. Accordingly, damage, fatigue and the like resulted from the thermal stresses produced by the temperature cycle can also be prevented. Furthermore, it is advantageous in that the positioning of the light emitting end of the light guide 10 is facilitated.

Reflection preventing films 101 and 102 formed of silicon dioxide, for example, having a single layer or multiple layers are formed on the both interface surfaces of the light introducing window 42 by a method of vapor deposition or the like. This suppresses reflection of light signals which will cause transmission loss of light signals and improves the transmission efficiency. A material which can satisfactorily stand high temperature when soldered is selected for the reflection preventing film, since the formation of the reflection preventing film is performed before the light introducing window 42 is fixed to the fixing jig 41 by soldering or the like. Silicon dioxide is suitable for this demand.

A similar reflection preventing film 105 is formed on the light entering end interface of the light guide 10 to enhance the transmission efficiency of light signals. The increase in the transmission efficiency of light signals enhances the sensitivity of the device. The reflection preventing film has higher reflection preventing effect as the number of layers increases.

Figure 8:
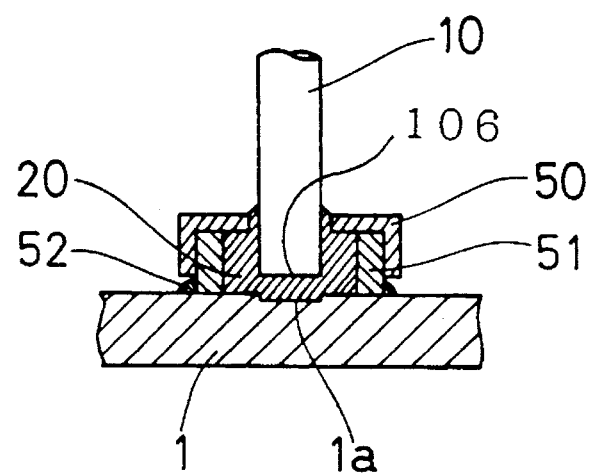
FIG. 8 is an enlarged front sectional view of the vicinity of the light receiving surface in the preferred embodiment.
Figure 9:
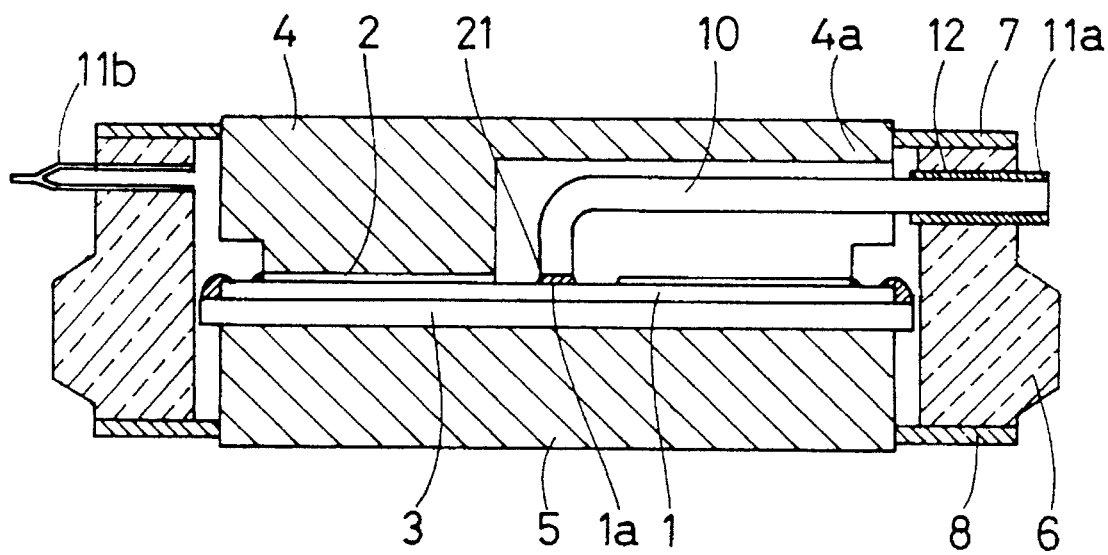
FIG. 9 is a front sectional view of a conventional light trigger type semiconductor device.

FIG. 8 is an enlarged front sectional view in the vicinity of the light emitting end interface of the light guide 10. Two guide rings 50 and 51 are used to normally position the light emitting end of the light guide 10 to the light receiving portion 1a of the semiconductor substrate 1. The guide rings 50 and 51 are formed of resin or the like. The guide ring 50 has a through hole formed at its center, into which the light guide 10 is inserted. Furthermore, the guide ring 50 fits to the outer periphery of the guide ring 51.

To fix the light emitting end of the light guide 10, the guide ring 51 is first provided at a position concentric with the light receiving portion 1a of the semiconductor substrate 1 and then it is fixed with adhesive agent 52. After that, optical coupling agent 20 is put inside the guide ring 51. Resin which has some fluidity before solidifying and maintains some flexibility after thermally treated or left at ordinary temperature and solidified, and which has optical transparency and refractive index of about 1.3 to 1.5 is selected for the optical coupling agent 20. Silicone rubber system is suitable for this, for example.

Before the optical coupling agent solidifies, the light emitting end of the light guide 10 is inserted into the optical coupling agent 20 and the guide ring 50 with the light guide 10 previously inserted therein is fitted to the guide ring 51. As the guide ring 51 is already fixed at the predetermined position, the light emitting end of the light guide 10 is naturally positioned above the light receiving portion 1a when the guide rings 50 and 51 fit to each other. Accordingly, light signals are efficiently transmitted to the light receiving portion 1a of the semiconductor substrate 1.

As the optical coupling agent 20 has the flexibility, the expansion and shrinkage of the parts such as the light guide 10 caused by the temperature cycle are absorbed by the optical coupling agent 20. Accordingly, damage or the like of the light guide 10 caused by the thermal stresses resulted from the temperature cycle is prevented.

A reflection preventing film 106 of silicon dioxide, for example, is also formed at the light emitting end of the light guide 10 to further enhance the transmission efficiency.

<Examples of Modifications>

Although the description has been made on the light activated thyristor of the pressure contact type in the preferred embodiment above, the reflection preventing film and the optical coupling agent produce the same effects to light activated thyristors which are not the pressure contact type. Furthermore, not limited to the light activated thyristors, the same effects can be obtained in general light trigger type semiconductor devices.

While the invention has been shown and described in detail, the foregoing description is in all aspects illustrative and not restrictive. It is therefore understood that numerous modifications and variations can be devised without departing from the scope of the invention.

What is claimed is:

1. A light trigger type semiconductor device comprising:

a semiconductor substrate;

a light introducing path for transmitting a light signal to the semiconductor substrate, said light introducing path having an interface through which the light signal passes, the interface having a reflection prevention film formed thereon; and an optical coupling agent for transmitting the light signal, said coupling agent positioned between the semiconductor substrate and said reflection prevention film.

2. The light trigger type semiconductor device according to claim 1, wherein said light introducing path comprises a linear light guide and a reflection prevention film is formed on an end of the light guide through which said light signal passes.

3. The light trigger type semiconductor device according to claim 2, wherein said reflection prevention film is formed on a light entering end of said light guide.

4. The light trigger type semiconductor device according to claim 2, wherein said reflection prevention film is formed on a light emitting end of said light guide.

5. The light trigger type semiconductor device according to claim 4, wherein said light introducing path comprises a linear light guide and the light emitting end of the light guide is attached to said semiconductor substrate through an optical coupling agent.

6. The light trigger type semiconductor device according to claim 2, wherein said reflection prevention film is substantially comprised of silicon dioxide.

7. The light trigger type semiconductor device according to claim 6, wherein said reflection prevention film is substantially comprised of silicon dioxide.

8. A light trigger type semiconductor device comprising:

a semiconductor substrate;

a light introducing window having a surface with a reflection prevention film formed thereon, and through which a light signal is passed; and a light introducing path having an end with a light entering interface, said light entering interface disposed between the window and the light introducing path, such that the light signal passed from the window passes through the interface and the light introducing path before being transmitted to the substrate.

* * * * *